No. 890,924. PATENTED JUNE 16, 1908.
T. POWELL.
GATE.
APPLICATION FILED JAN. 10, 1908.
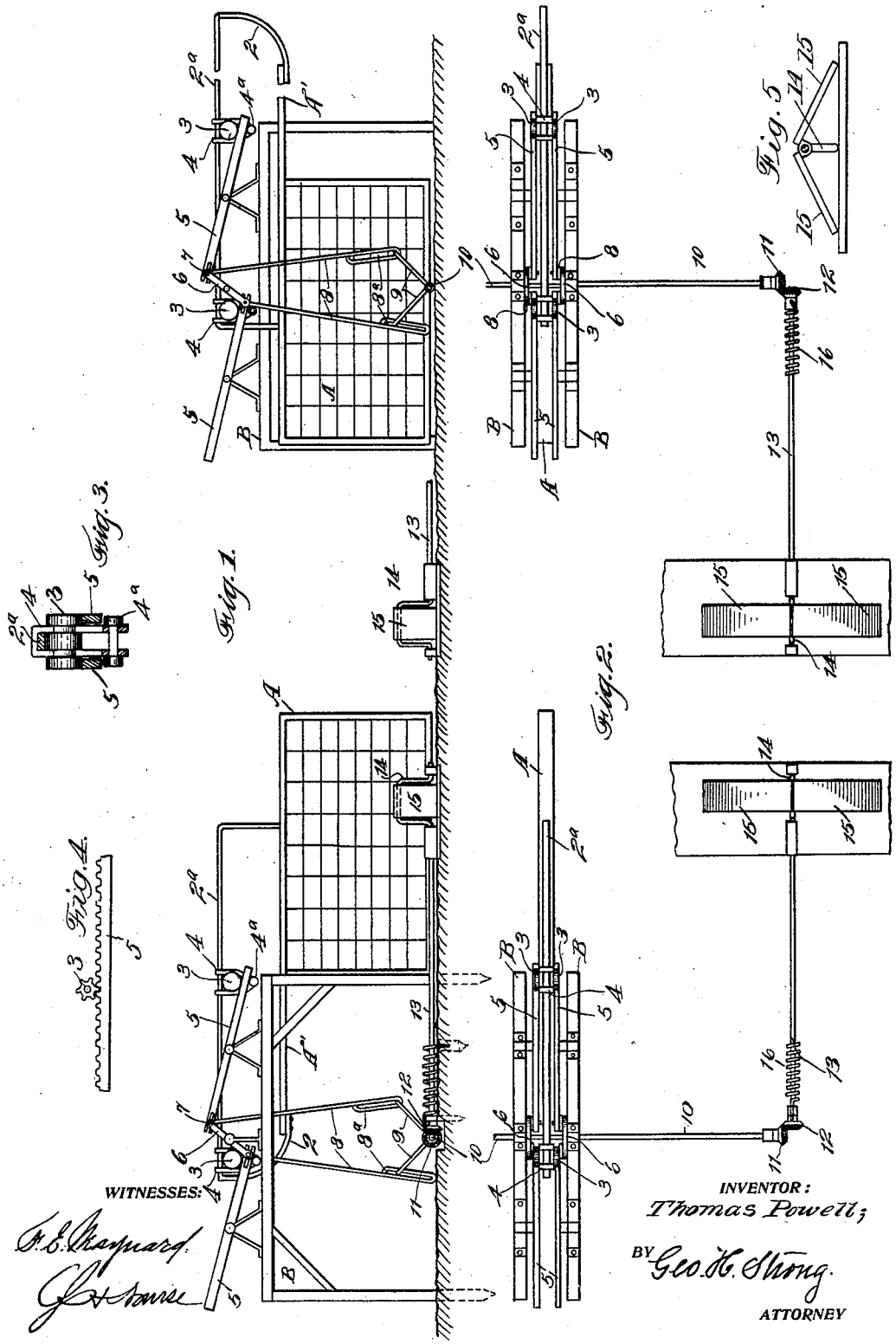
WITNESSES:
INVENTOR:
Thomas Powell;
BY Geo. H. Strong.
ATTORNEY

UNITED STATES PATENT OFFICE.

THOMAS POWELL, OF SANTA ROSA, CALIFORNIA.

GATE.

No. 890,924.

Specification of Letters Patent.

Patented June 16, 1908.

Application filed January 10, 1908. Serial No. 410,091.

*To all whom it may concern:*

Be it known that I, THOMAS POWELL, citizen of United States, residing at Santa Rosa, in the county of Sonoma and State of California, have invented new and useful Improvements in Gates, of which the following is a specification.

My invention relates to the class of farm and like gates which it is desirable to open automatically for passage, and to automatically close after the vehicle or other machine has passed.

It consists in the combination of parts, and in details of construction which will be more fully explained by reference to the accompanying drawings, in which—

Figure 1 is a side elevation showing one gate open and the other gate closed. Fig. 2 is a plan view of same. Fig. 3 is a detail of the clip. Fig. 4 is an enlarged detail showing one of the toothed tracks and its roller. Fig. 5 is a detail showing the inclines 15 and their supporting bases, and one of the cranks 14.

It is the object of my invention to provide a convenient means for opening and closing gates automatically by placing them in position to travel upon inclined guides, so that the gates being first raised bodily and retaining their horizontal position, will move so as to open a passage, and after a vehicle has passed, they are in like manner raised bodily in horizontal position, and the inclines reversed to cause the gates to again close.

I have illustrated my invention in the present case, as applied to two gates A—A, and these gates are here shown as slidable with relation to a fixed portion of a fence or obstruction as at B. In the present case this fixed portion is shown formed of two parallel parts at each side of the gate-way between which the gates are slidable and protected, but it will be understood that the operating mechanism may be supported at one side of a single fixed structure.

The gates A have extensions A' at the rear ends, and from these extensions, arms 2 extend upwardly and connect with a bar $2^a$ which lies above and substantially parallel with the top bar of the gate. Upon this bar $2^a$ are carried sliding clips for rollers 3. These slides are here shown as carried by clips 4 so that the rollers are suspended beneath the bars $2^a$, and they travel loosely on the bar $2^a$ as the gate moves.

5 are bars centrally pivoted upon the top of the structure B, and capable of being tilted to stand at an incline in either direction. I have here shown two pairs of these bars for each gate, and they form tracks upon which the rollers 3 are capable of traveling, so that when the tracks 5 are inclined downwardly toward the gate opening, the rollers traveling upon these tracks, will cause the gate to move into its closing position. When tilted in the other direction, these tracks standing in line with each other, one supporting one of the rollers 3, and the other the other roller, the gate will be lifted bodily without changing its parallelism, and when the bars or tracks 5 are thus tilted, it will be seen that the inclination will cause the rollers to travel in the other direction and the gate to move outwardly until it is open.

The clips 4 may be extended downward to carry rollers $4^a$ which travel against the lower edges of the tracks 5 to hold the rollers 3 in contact with these tracks. The tracks 5 may be toothed on their upper edges, and the rollers 3 may be similarly toothed to maintain the rollers in proper relation to the tracks during the movements of the gate. In order to effect the movement of these tracks in unison, I have shown levers 6 fulcrumed between the contiguous ends of the tracks, and these levers have pins 7 projecting from the ends. The contiguous ends of the tracks 5 are slotted longitudinally, and the pins 7 extend into these slots, so that when the lever arms 6 are turned upon their axes, the pins will move in segments of circles and will travel in the slots, and thus move the tracks to stand at an inclination in either direction as is clearly shown. In order to operate these levers, I have shown connecting rods 8, the upper ends of which are connected with the ends of the levers 6 so that a pull downward upon one of the rods 8 will tilt the levers and the track in one direction, and a pull downward upon the other rod will tilt the levers and track in the opposite direction. This movement of the connecting rods is effected by lever arms 9 fixed to a shaft 10 which is suitably journaled beneath the lever arms 6, and extends outwardly from the fixed portion of the structure, and parallel with the line of travel of a vehicle which is to pass between the gates. The outer ends of these shafts 10 carry bevel-gears 11, and these mesh with other bevel-gears 12 fixed upon a shaft 13 which extends parallel with the fence and gates to a point which will be in line with the travel of the wheels of a vehicle approaching the gate. The inner ends of each of these shafts has a crank 14, and to this crank are fixed the inner ends of inclines 15, which extend towards and away from the gate in each direction from the cranks. These cranks are normally maintained standing in an upward position so that the inclines 15 have their central portions, which are hinged to the cranks, raised, the other and outer ends being slidable upon suitable bases which will allow them to move smoothly.

The cranks are held in their upward position by means of spiral springs 16 coiled around the crank shafts 13 having one end fixed to the pinion 12, and the other end at a point nearer the cranks so that when the cranks are depressed a tension will be brought upon the spring sufficient to return the cranks to their approximately vertical position after the inclines 15 have been released from the pressure of the vehicle wheels.

By reason of the loose connection between the cranks 9 and the connecting rods 8, it will be seen that after the gate has once been moved in either direction, the constant return of the cranks 14 after each depression in one direction, will not further affect the gate, because the crank arms 9 can be moved freely within the slots of the connecting rods 8; but whenever the cranks and their inclines are acted upon from the opposite direction, and press down upon the opposite side, the crank arms 9 will act through the connecting rods and other mechanism to raise the gates, change the position of the inclined tracks, and cause the gates to move in the opposite direction.
It will be understood that in case of double gates, the cranks with their inclines 15 will each be connected with one of the gates, so that both gates will be raised simultaneously and caused to slide outwardly when the vehicle strikes the inclines.

As soon as the vehicle has passed the first inclines, and has passed through the gate, it will reach the second inclines and will move these cranks and inclines in the opposite direction, and this acts through the shafts and connections before described to again raise the gates, tilt the tracks in the opposite direction, and cause the gates to slide toward each other and close. These two actions are made possible by the connection of the crank arms 9 with the connecting rods 8.

The connecting rods have their lower ends formed with open channels, as shown at $8^a$, and the ends of the crank arms 9 enter these channels.

The crank arms 9 stand at such an angle with each other that when one of the inclines 15 is moved to press its crank 14 down into a horizontal position the crank arm 9 nearest the gate, will engage the bottom of the slot or channel $8^a$, and will pull downwardly upon its connecting rod 8 which, being connected at the upper end with the inner end of the tilting lever 6, will pull downwardly upon that lever, and thus change the angle of the tracks 5 as previously described. The other crank arm 9 will lie in such position in the slot or channel of its connecting rod 8 that it will be free to move in said slot without acting upon the connecting rod, thus allowing the rod which is connected with the opposite end of the tilting lever 6 to slide upwardly without impediment.

When the team, having passed through the gate, reaches the inclines 15, it will be manifest that the crank arm 14 will be turned in the opposite direction or away from the gate; and this causes the second crank arm 9 to engage with the bottom of the slot of its connecting rod 8, this rod having been raised by the movement of the tilting lever arm 6. This engagement of the crank arm 9 with the connecting rod 8, will act to pull down upon the tilting lever arm 6 and again change the angle of the tracks, so that the rollers 3 will move down the tracks, and the gate will again close. It will be understood that this operation may be effected with either a single or a double gate; the arrangement of the cranks 14, and the incline 15 being such that either a single one may be used upon each side of the gate, or they may be used in pairs as found most desirable or necessary.

The gates will be balanced or counterweighted if found necessary so that the rear end will sufficiently balance the inwardly projecting portion of the gate to allow the weight to be equally distributed upon the bearing rollers, and to move easily while maintaining its horizontal plane.

Having thus described my invention, what I claim and desire to secure by Letters Patent is—

1. The combination with an endwise movable gate, of mechanism whereby the gate is first raised bodily in a horizontal position, inclines upon which the gate may travel in either direction down to its normal level, and mechanism by which the position of the inclines may be reversed, said mechanism including a tiltable lever loosely connected with the contiguous ends of the tracks, a horizontal crank shaft, links connecting the cranks with the tiltable lever, and means to revolve the shaft in either direction.

2. The combination with an endwise movable gate, of inclined tracks standing in line with each other, a rail fixed to the gate, rollers carried by the rail adapted to travel upon the track, mechanism whereby the tracks may be simultaneously tilted so as to incline in either direction, said mechanism including a crank shaft in the roadway, intermediate connections between said shaft and a second crank shaft, a tiltable lever connecting the contiguous ends of the tracks, and connecting rods between said lever ends and the cranks of the second shaft.

3. The combination with an endwise movable gate, of a pair of centrally fulcrumed tracks located one behind the other, a rail fixed to the gate, rollers carried by the rail adapted to travel upon the tracks, and a double-armed tilting lever fulcrumed between the contiguous ends of the tracks, and means by which said lever may be turned to tilt the tracks in either direction, said means including crank shafts in the roadway with hinged inclines, and an intermediate crank shaft actuated thereby and having its cranks connected with the tilting lever.

4. The combination with an endwise movable gate of pairs of centrally fulcrumed tracks located one behind the other, a double-armed tilting lever fulcrumed between the contiguous ends of the tracks, pins upon the lever and slots in the ends of the tracks in which the pins are movable to simultaneously incline the tracks either outwardly or inwardly, a rail fixed to the gate, rollers carried by the rail adapted to travel upon the tracks whereby the gate is first raised to a horizontal position and then caused to travel down the inclines to either open or close.

5. In a gate-actuating mechanism of the character described, a pair of centrally fulcrumed tracks situated in line with each other, an intermediate centrally fulcrumed tilting lever connected with said tracks, a horizontal shaft with intermeshing gears having a pair of divergent crank arms, rods connecting the tilting lever with said crank arms, a second shaft parallel with the gate having bevel-gear connection with the first named shaft, and a crank arm upon its inner end adapted to be turned and depressed in either direction by the passage of a wheel over it.

6. In a gate-actuating apparatus of the character described, a pair of centrally pivoted tracks in line with each other, bearing wheels connected with the gate and adapted to travel upon said tracks, a double-armed centrally fulcrumed lever connecting with the contiguous ends of the tracks, connecting rods extending downwardly from each end of the tiltable lever having open slots in their lower ends, a shaft journaled transversely to the line of travel of the gate having divergent crank arms connecting with the slotted rods, and capable of tilting the double lever and the tracks when turned in either direction, a second shaft parallel with the travel of the gates, bevel-gears connecting the two shafts, depressible cranks formed upon the second shaft having inclines pivoted to the cranks with their outer ends freely slidable, said inclines being depressible to actuate the intermediate mechanism and the inclined tracks whenever a wheel passes over them.

7. In a gate-actuating apparatus of the character described, a pair of centrally pivoted tracks in line with each other, bearing-wheels connected with the gate and adapted to travel upon said tracks, a double-armed centrally fulcrumed lever connecting with the contiguous ends of the tracks, connecting rods extending downwardly from each end of the tiltable lever having open slots in their lower ends, a shaft journaled transversely to the line of travel of the gate having divergent crank arms connecting with the slotted rods, and capable of tilting the double lever and the tracks when turned in either direction, a second shaft parallel with the travel of the gates, bevel-gears connecting the two shafts, depressible cranks formed upon the second shaft having inclines pivoted to the cranks with their outer ends freely slidable, said inclines being depressible to actuate the intermediate mechanism and the inclined tracks whenever a wheel passes over them, and a spring connection whereby the depressible cranks and inclines are raised to a normal position when released.

In testimony whereof I have hereunto set my hand in presence of two subscribing witnesses.

THOMAS POWELL.

Witnesses:
GEO. H. STRONG,
CHARLES A. RUFIELD.